US007318272B1

(12) United States Patent
Steiner

(10) Patent No.: US 7,318,272 B1
(45) Date of Patent: Jan. 15, 2008

(54) UNIVERSAL END CONNECTOR ATTACHMENT TOOL AND METHOD OF USE

(75) Inventor: Richard A. Steiner, East Haddam, CT (US)

(73) Assignee: Rostra Tool Company, Branford, CT (US)

( * ) Notice: Subject to any disclaimer, the term of this patent is extended or adjusted under 35 U.S.C. 154(b) by 242 days.

(21) Appl. No.: 11/153,736

(22) Filed: Jun. 15, 2005

(51) Int. Cl.
*B23P 19/00* (2006.01)

(52) U.S. Cl. ............................ 29/751; 29/750; 29/752; 29/753

(58) Field of Classification Search .................. 29/748, 29/750, 751, 752, 753
See application file for complete search history.

(56) References Cited

U.S. PATENT DOCUMENTS 5,392,508 A * 2/1995 Holliday et al. .............. 29/751
5,647,119 A * 7/1997 Bourbeau et al. ............. 29/751
6,272,738 B1 * 8/2001 Holliday et al. .............. 29/751
6,708,396 B2 * 3/2004 Holliday ...................... 29/751
7,210,327 B1 * 5/2007 Tarpill et al. ............ 72/409.12

* cited by examiner

*Primary Examiner*—Carl J. Arbes

(57) ABSTRACT

In a preferred embodiment, an apparatus, including: first and second jaws axially advanceable toward and retractable from each other; when advanced toward each other, the first and second jaws firmly attaching an end connector to a cable, elements of the end connector being loosely attached to the cable when the cable and the elements are placed between the first and second jaws before firm attachment of the elements to said cable; the first jaw having a support movable between first and second positions; when the support is in the first position, a first surface to abut a proximal surface of the end connector; and when the support is in the second position, a second surface of the first jaw to abut the proximal surface. A method of using the apparatus is also provided.

11 Claims, 18 Drawing Sheets

7/11 Connector
(70 in Lowered Position)

RCA Connector
(70 in Raised Position)

6/59 Connector
(70 in Raised Position)

7/11 POSITIONS

UNIVERSAL END CONNECTOR ATTACHMENT TOOL AND METHOD OF USE

BACKGROUND OF THE INVENTION

1. Field of the Invention

The present invention relates to cable end connectors generally and, more particularly, but not by way of limitation, to a novel end connector attachment tool and method of use thereof that can attach end connectors to a variety of cables.

2. Background Art

It is a principal object of the present invention to provide an end connector attachment tool and method of use thereof that can be used to attach end connectors to a variety of cables.

It is a further object of the invention to provide such an end connector attachment tool that is easy to use.

It is an additional object of the invention to provide such an end connector attachment tool that can be economically manufactured using conventional fabrication techniques.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus, comprising: first and second jaws axially advanceable toward and retractable from each other; when advanced toward each other, said first and second jaws firmly attaching an end connector to a cable, elements of said end connector being loosely attached to said cable when said cable and said elements are placed between said first and second jaws before firm attachment of said elements to said cable; said first jaw having a support movable between first and second positions; when said support is in said first position, a first surface of said support to abut a proximal surface of said end connector; and when said support is in said second position, a surface of said first jaw to abut said proximal surface. A method of using said apparatus is also provided.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
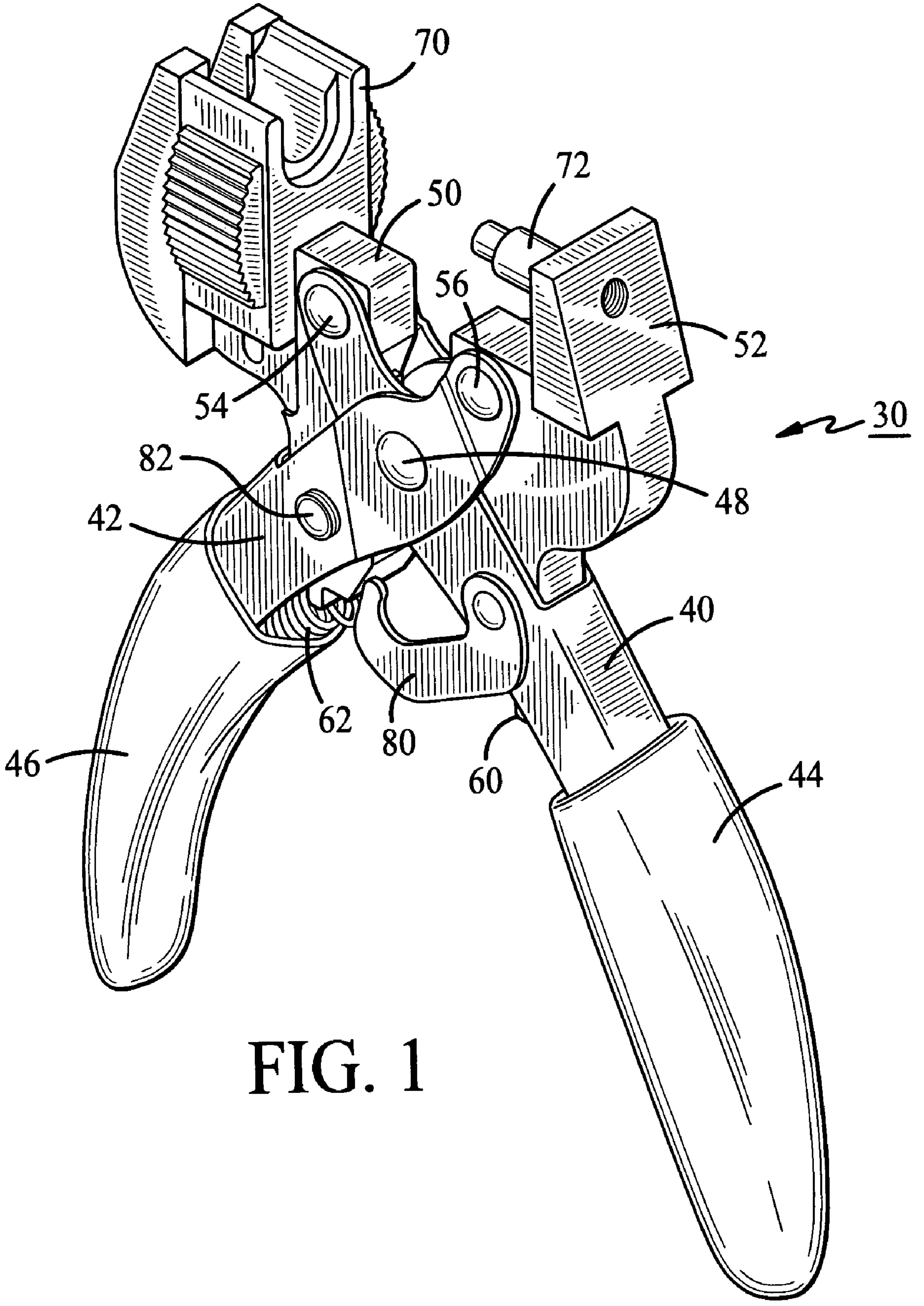
FIG. 1 is a top/front/right side isometric view of an end connector attachment tool constructed according to one embodiment of the present invention, with the support thereof in a raised position.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

Figure 2:
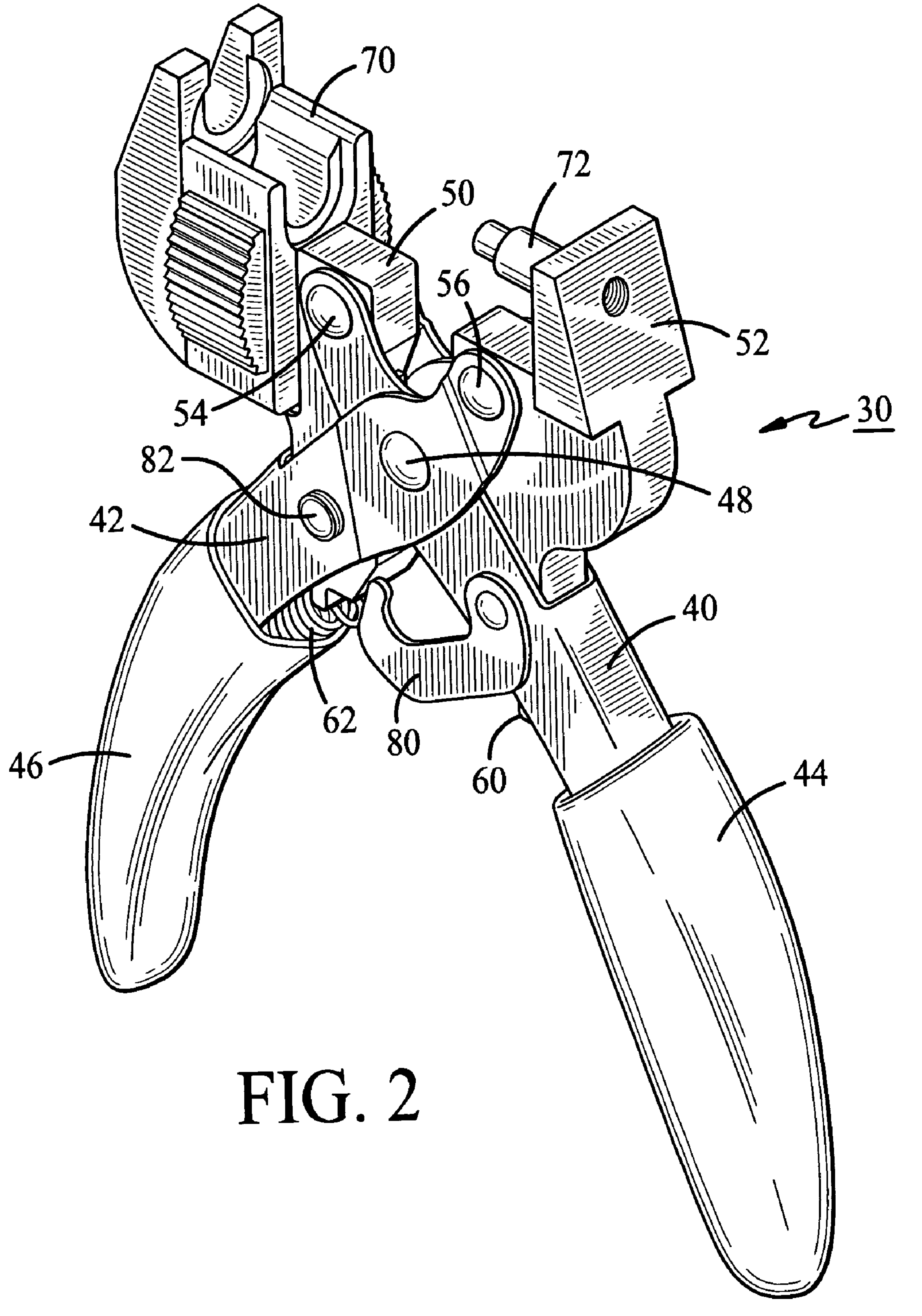
FIG. 2 is a top/front/right side isometric view of the end connector attachment tool of FIG. 1 with the support thereof in a lowered position.

FIGS. 1 and 2 illustrate an end connector attachment tool, constructed according to one embodiment of the present invention, and generally indicated by the reference numeral 30. End connector attachment tool 30 includes two, generally vertical, pliers-type handles 40 and 42, which are preferably constructed of a suitable metallic material, the distal ends of which are covered, respectively, by an elastomeric material 44 and 46 and pivotally attached at 48. Pivotally attached, at 54 and 56, respectively, to the distal ends of handles 40 and 42 are first and second, generally vertical, jaws 50 and 52, the first and second jaws being advanced and retracted axially toward and away from each other by pressing together and releasing handles 40 and 42. Springs 60 and 62, attached respectively, to handles 40 and 42 and to first and second jaws 50 and 52 bias tool 30 to the open position shown on FIGS. 1 and 2. First jaw 50 carries support 70, while second jaw 52 bears anvil 72 inserted therein. A locking arm 80 is rotatably attached to handle 40, the distal end of which locking arm is to engage a stud 82 defined in handle 42 (the locking arm being shown on FIGS. 1 and 2 in unlocked position). FIG. 1 shows support 70 in raised position, while FIG. 2 shows the support in lowered position.

Figure 3:
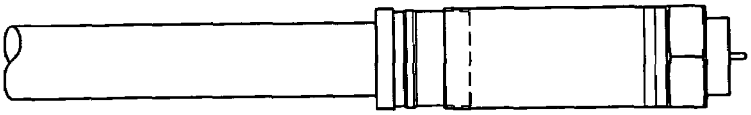
FIGS. 3-5 are side elevational views of various cables and end connectors that can be attached with the end connector tools of the present invention.
Figure 4:
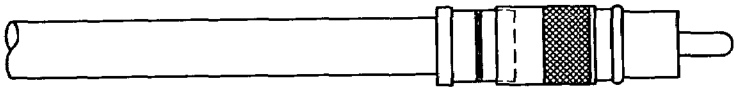
Figure 5:
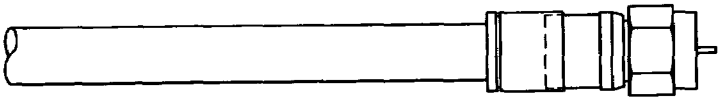

FIGS. 3-5 illustrates various types of end connectors that can be attached to their respective cables with tool 30 (FIGS. 1 and 2) and indicate whether support is in a raised (FIG. 1) position or a lowered (FIG. 2) position. As is well known by those skilled in the art, that the elements of the end connectors are loosely placed on the cables, the cable with the end connector elements loosely attached are placed in open tool 30 and handles 40 and 42 are pressed together to firmly attach the end connector elements to their respective cable. Such attachment action is more fully described in U.S. Pat. No. 4,932,091, issued Jun. 12, 1990, to Krzyzanski, titled END CONNECTOR ATTACHMENT TOOL, and assigned to the assignee of the present invention, the disclosure of which patent is incorporated by reference hereinto.

Figure 6:
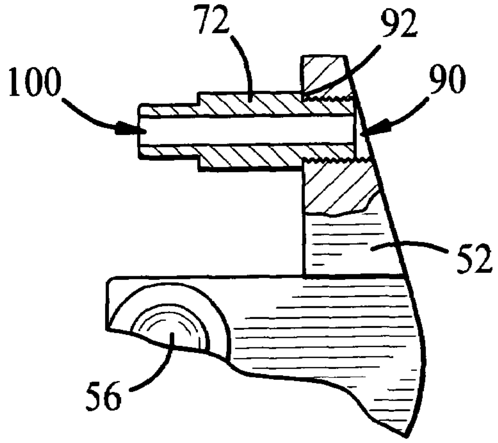
FIG. 6 is a fragmentary side elevational view, partially in cross-section, of the anvil installed in the tools of the present invention.

FIG. 6 illustrates the attachment of anvil 72 to second jaw 52. Here, the proximal end of anvil 72 is screwed into a threaded horizontal hole 90 defined in second jaw 52 until a vertical shoulder 92 formed on the anvil bottoms out against the second jaw. This leaves inwardly facing opening 100 to accept therein the center conductor of the cable shown on FIGS. 3-5.

Figure 7:
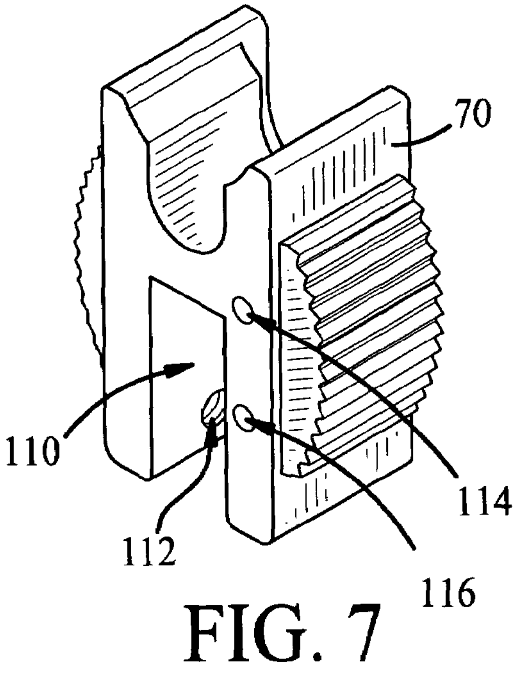
FIG. 7 is an isometric view of the support of the tool of FIG. 1.

FIG. 7 illustrates support 70 which includes a downwardly facing channel 110, one leg of which has a threaded horizontal hole 112 defined therethrough and the other leg of which has vertically aligned detent dimples 114 and 116 defined in a vertical surface thereof.

Figure 8:
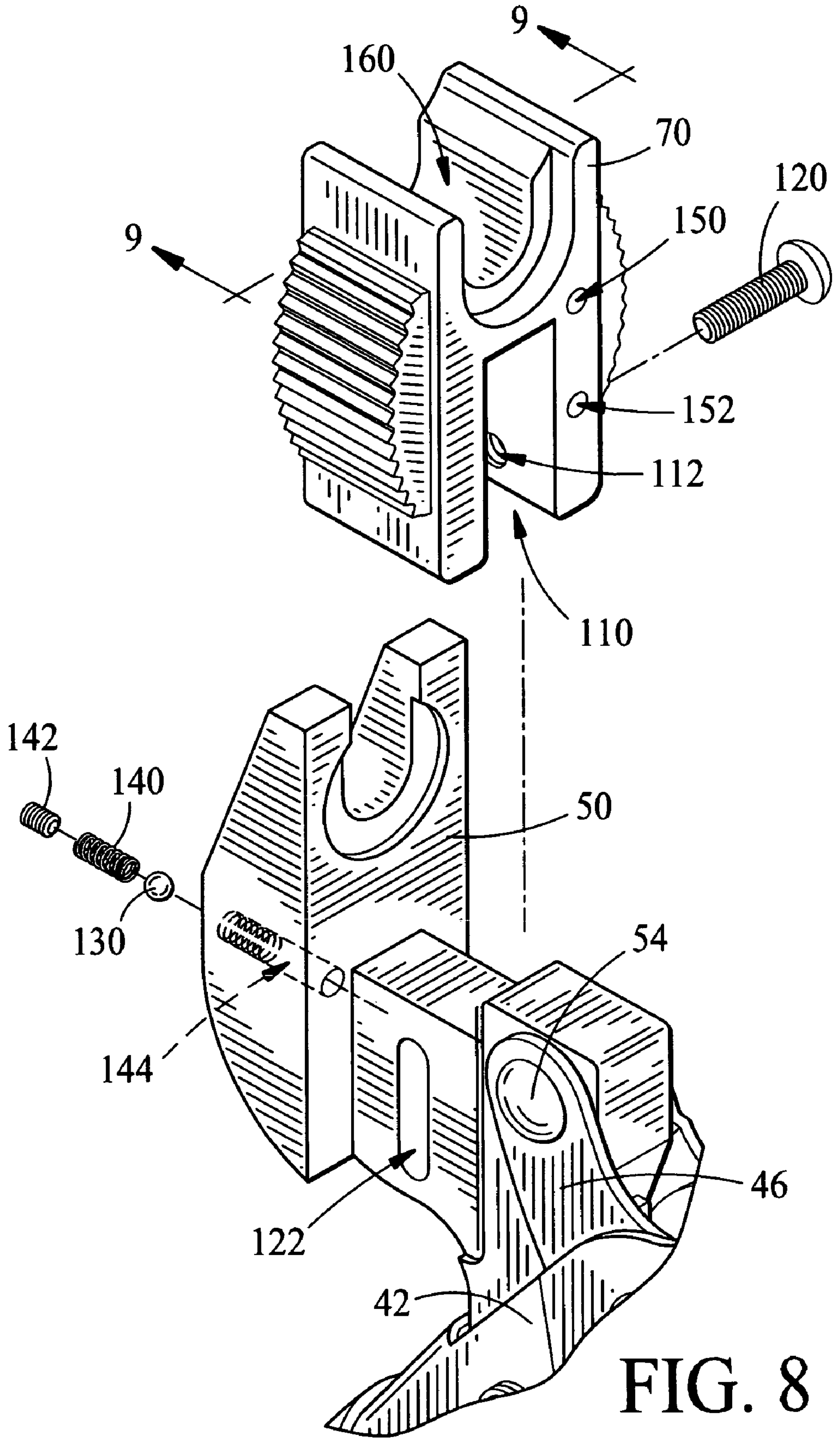
FIG. 8 is a fragmentary, exploded, isometric view showing the means of attachment of the support to the tool of FIG. 1.

FIG. 8 illustrates the means of attachment of support 70 to first jaw 50. Here, a screw 120 is threaded through hole 112 and into a vertical slot 122 defined in first jaw 50. Thus attached, support 70 can move vertically with respect to first jaw 50, but cannot leave the first jaw by virtue of screw 120 protruding into vertical slot 122. Support 70 is held in a raised (FIG. 1) or a lowered (FIG. 2) position by a detent ball 130 engaging, respectively, either detent dimples 116 or 114 (FIG. 7) on the support. Detent ball 130 is biased to such engagement by means of a spring 140 and a set screw 142 threadingly inserted into horizontal hole 144 defined through first jaw 50. Also shown on FIG. 9 are vertically aligned detent dimples 150 and 152, horizontally opposite detent dimples 114 and 116, respectively, the purpose of detent dimples 150 and 152 is described infra.

Figure 9:
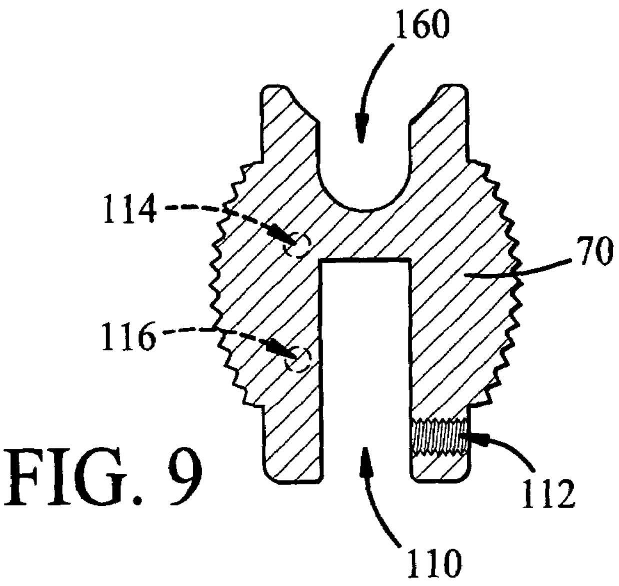
FIG. 9 is an end elevational view, in cross-section, taken along line "9-9" of FIG. 8.
Figure 10:
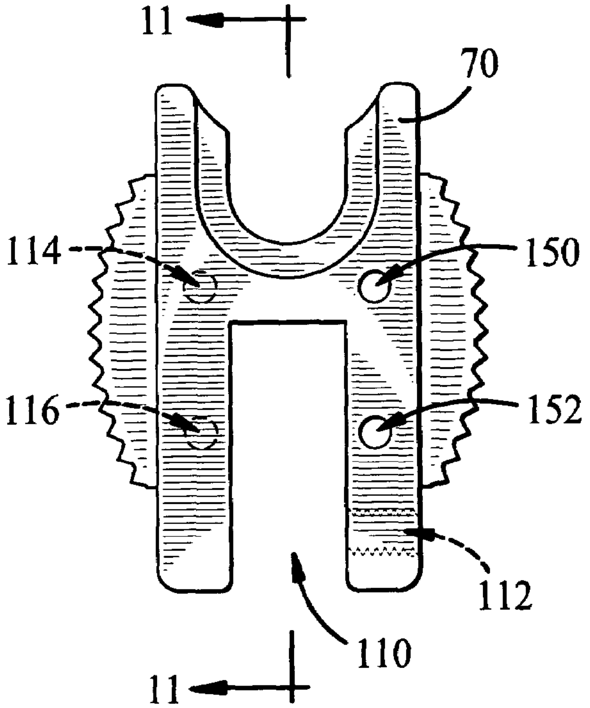
FIG. 10 is an end elevational view of the support of the tool of FIG. 1.

FIGS. 9 and 10 illustrate more clearly the elements of support 70.

Figure 11:
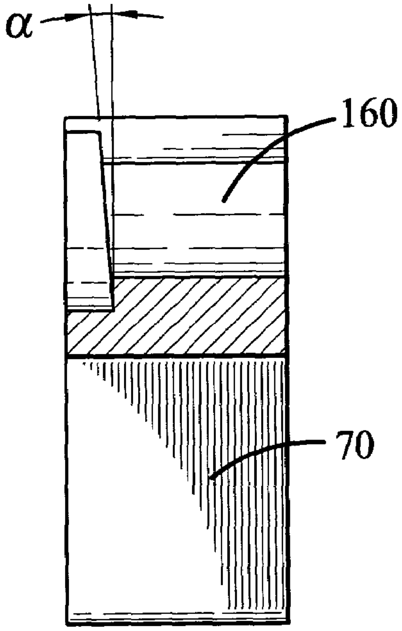
FIG. 11 is a side elevational view of the support of the present invention, partially in cross-section, taken along line "11-11" of FIG. 10.

FIG. 11 illustrates that upper pocket 160 of support is angled inwardly (shown exaggerated on FIG. 11, the angle $\alpha$ actually being about one degree). This angle permits the top, unsupported part of a semi flexible RG 6/59 end connector to be over driven, thus making complete compression possible.

Figure 12:
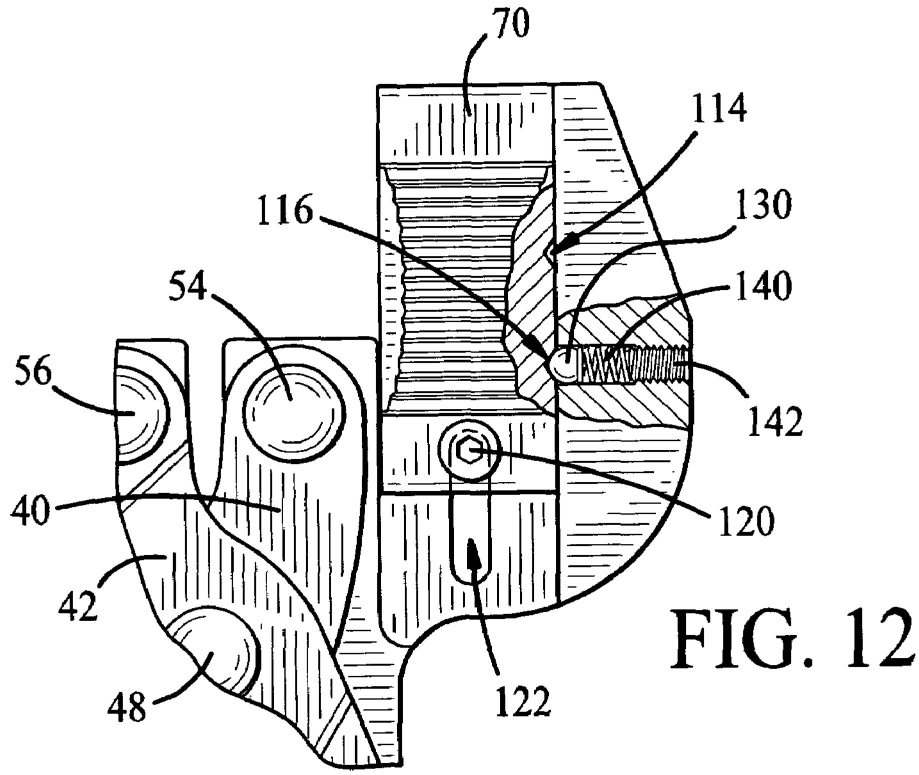
FIG. 12 is a fragmentary, end elevational view, partially in cross-section, of the end connector attachment tool of FIG. 1, with the support thereof in raised position.

FIG. 12 illustrates support 70 in its raised position, with detent ball 130 engaging detent dimple 116.

Figure 13:
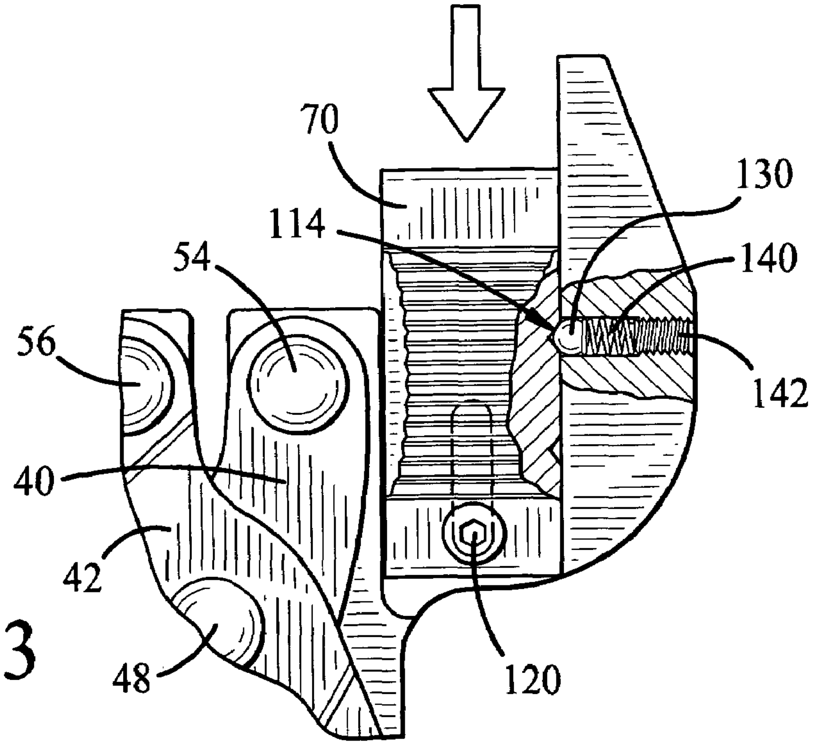
FIG. 13 is a fragmentary, end elevational view, partially in cross-section, of the end connector attachment tool of the tool of FIG. 1, with the support thereof in lowered position.

FIG. 13 illustrates that support 70 has been moved to its lowered position, as indicated by the arrow, with detent ball 130 engaging detent dimple 114.

Figure 14:
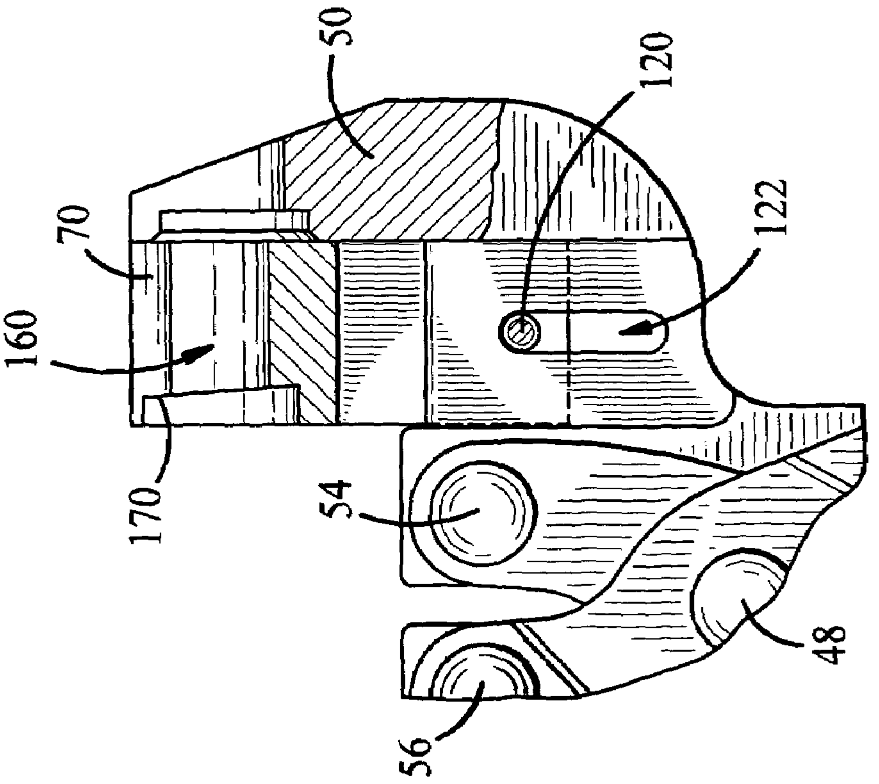
FIG. 14 is a fragmentary, side elevational view, partially in cross-section, of the end connector attachment tool of FIG. 1, with the support thereof in raised position for attachment of an end connector to the cable of FIG. 4.

FIG. 14 illustrates support 70 in its raised position for the attachment of the end connector elements shown on FIG. 4, with the proximal end of the end connectors to abut angled surface 170.

Figure 15:
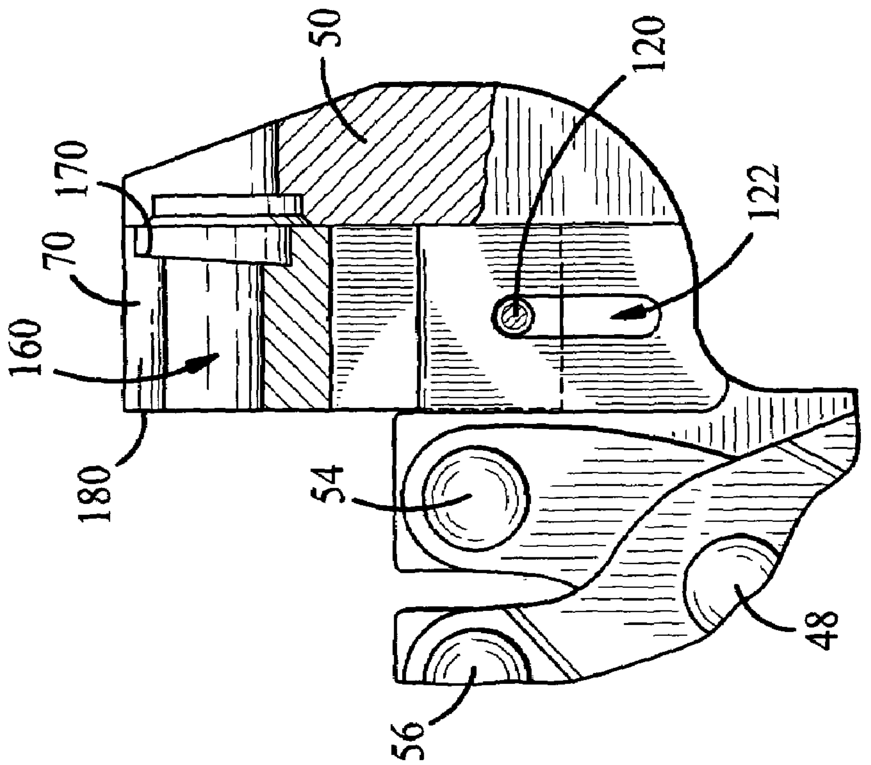
FIG. 15 is a fragmentary, side elevational view, partially in cross-section, of the end connector attachment tool of FIG. 1, with the support thereof in raised position for attachment of the end connector to the cable of FIG. 5.

FIG. 15 illustrates support 70 reversed (and raised). This has been accomplished by removing screw 120, rotating support 70 one hundred eighty degrees, and replacing the screw. In this position, detent ball 130 (FIG. 8) engages detent dimple 152 and the end connector elements shown on FIG. 5 can be attached, with the proximal end of the end connector to abut vertical surface 180.

Figure 16:
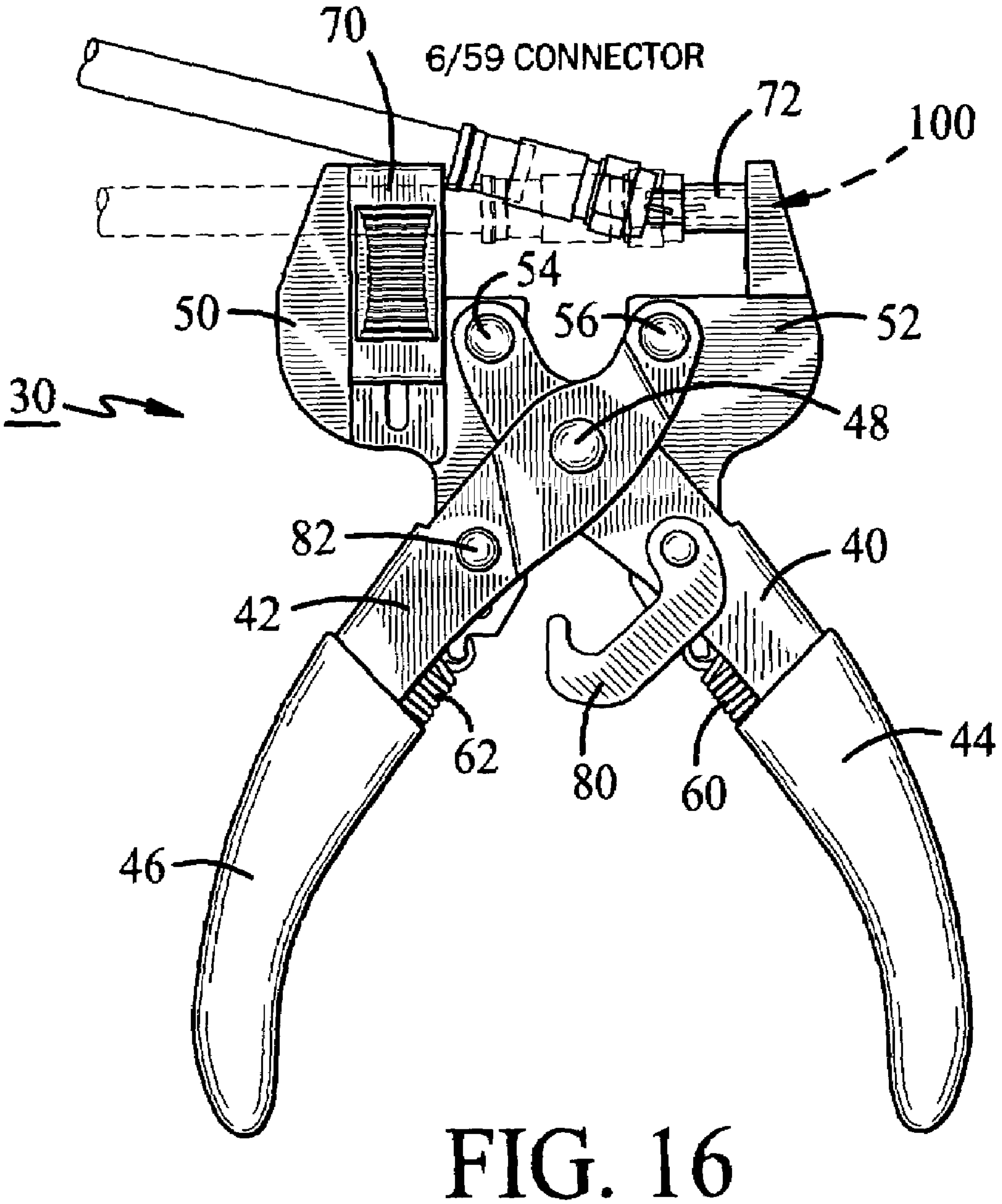
FIG. 16 is a front elevational view of the end connector attachment tool of FIG. 1, showing the insertion thereinto of the cable and end connector of FIG. 5.

FIG. 16 illustrates the cable and end connector of FIG. 5 being inserted in tool 30, with the support being oriented as shown on FIG. 15. The center conductor of the cable is inserted into opening 100 and the cable and end connector rotated to a horizontal position. Then, handles 40 and 42 are pressed together to firmly attach the end connector to the cable.

Figure 18:
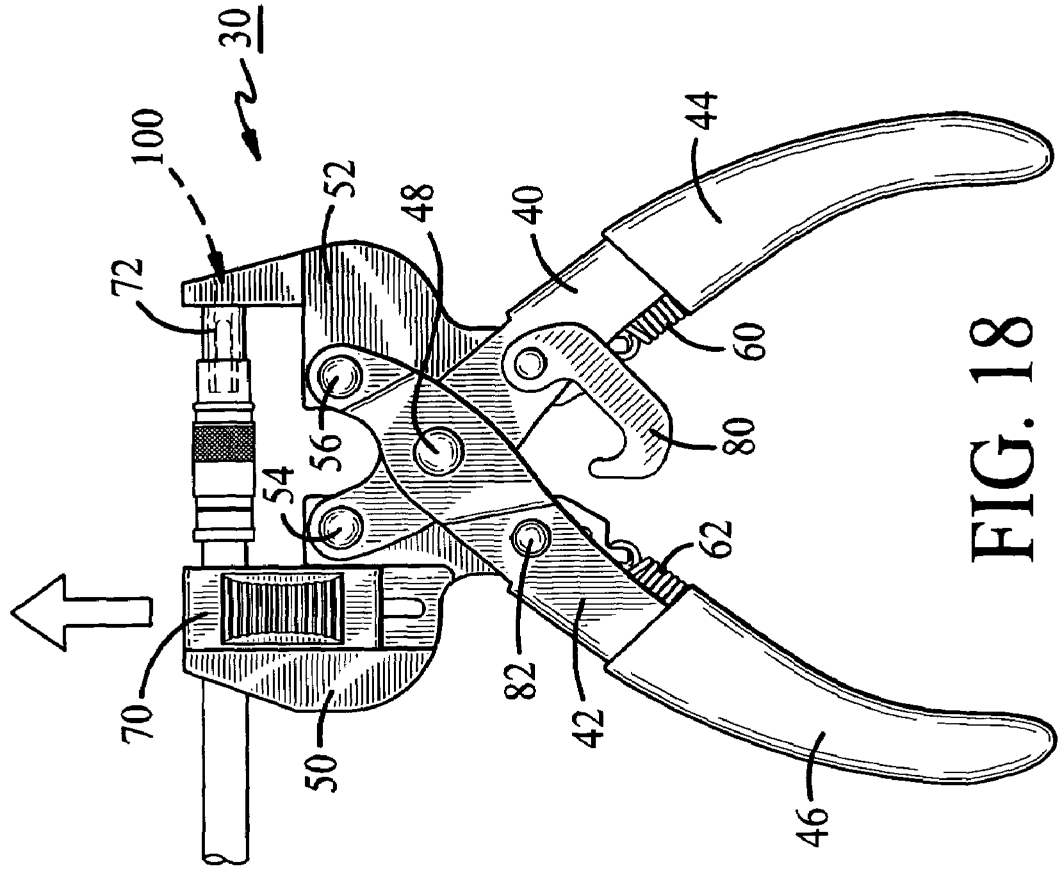
FIGS. 17 and 18 are front elevational views of the end connector attachment tool of FIG. 1, showing the insertion thereinto of the cable and end connector of FIG. 4.
Figure 17:
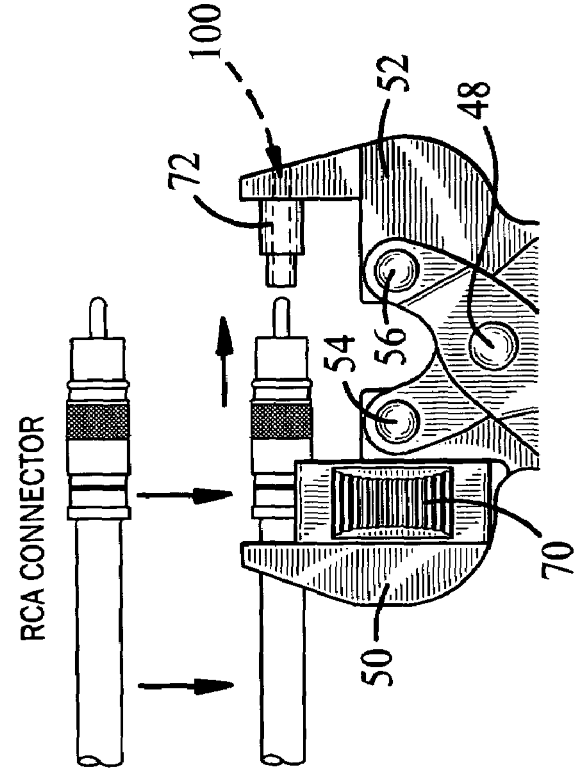

FIGS. 17 and 18 illustrate the insertion of the cable and end connector of FIG. 4. Here, the center conductor of the cable is too large in diameter to be placed at an angle into opening 100. In this case, the cable and the end connector elements are placed horizontally into opening 100, with support 70 in lowered position (FIG. 17). Then, support 70 is raised to its raised position, and the end connector elements firmly attached, with the support being in the orientation shown on FIG. 1.

Figure 19:
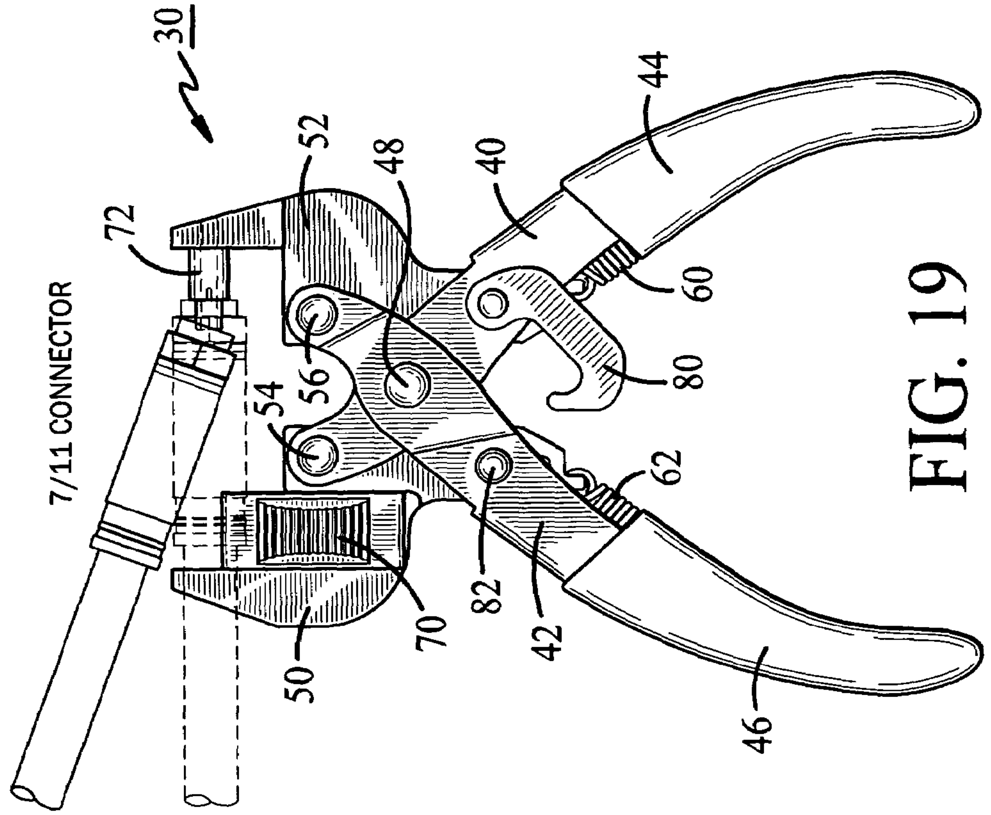
FIG. 19 is a front elevational view of the end connector attachment tool of FIG. 1, showing the insertion thereinto of the cable and end connector of FIG. 3.

FIG. 19 illustrates the insertion of the cable and end connector of FIG. 3 being rotatingly inserted into tool 30, with support 70 in lowered position.

Figure 20:
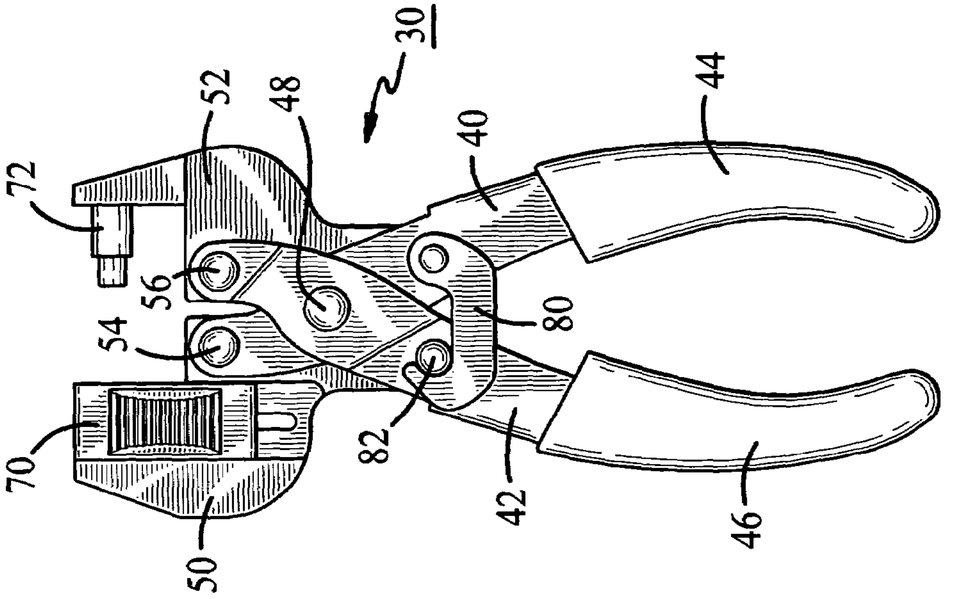
FIG. 20 is a front elevational view of the end connector attachment tool of FIG. 1 in locked position.

FIG. 20 illustrates tool 30 in locked position, with the distal end of locking arm 80 encircling stud 82.

Figure 21:
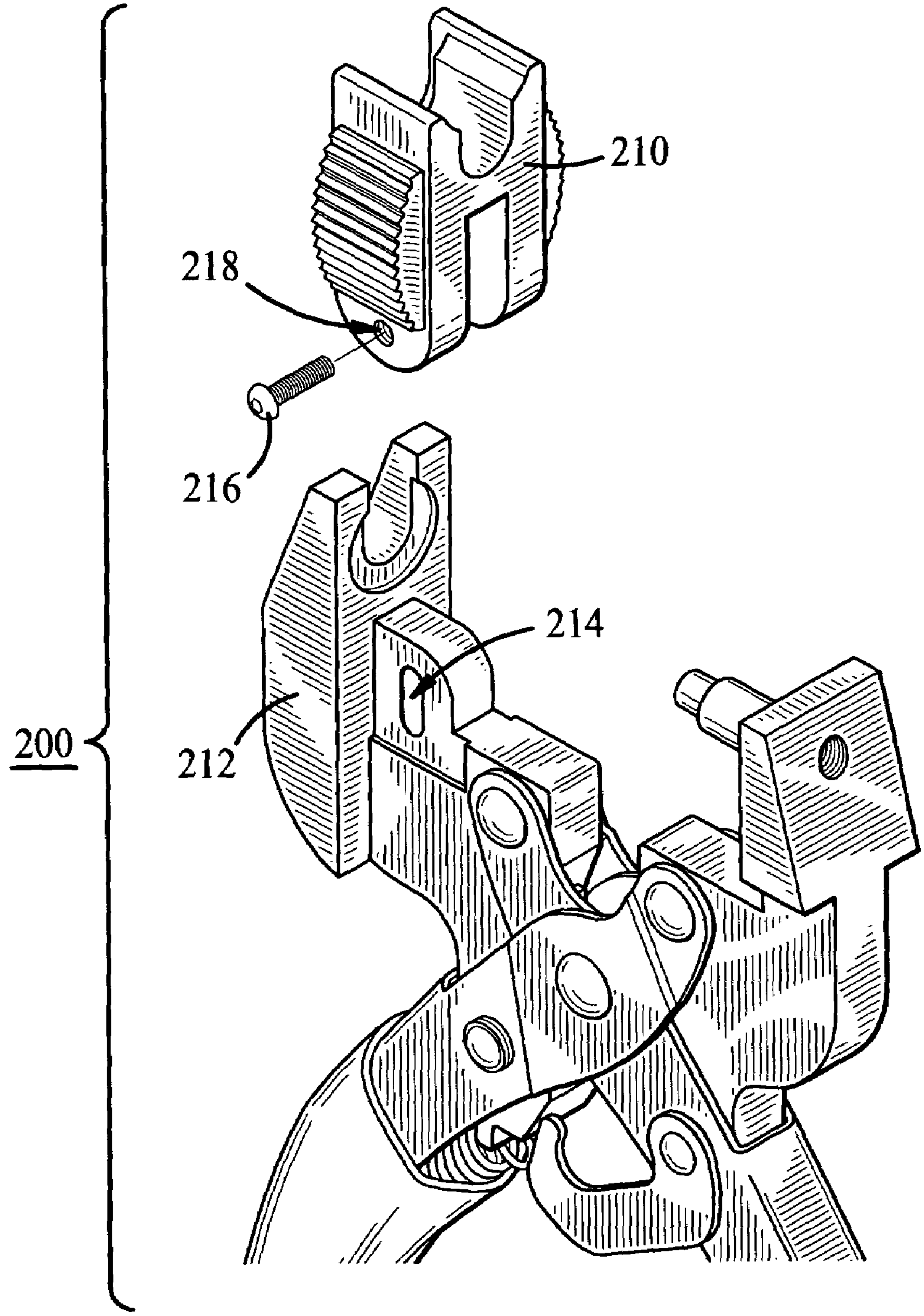
FIG. 21 is a an exploded, fragmentary, top/front/right side isometric view of an end connector attachment tool constructed according to a further embodiment of the present invention.

FIG. 21 illustrates an end connector attachment tool, constructed according to a further embodiment of the present invention, and generally indicated by the reference numeral 200. Elements of end connector attachment tool 200 common to respective elements of tool 30 (FIG. 1) are not given reference numerals. Tool 200 includes a support 210 rotatably disposed in a first jaw 212 and held in a vertical slot 214 formed therein by means of a screw 216 threadingly inserted through a hole 218 defined in a leg of the support and inserted into slot 214. Support 210 may be reversed as discussed with reference to FIG. 15 above.

Figure 23:
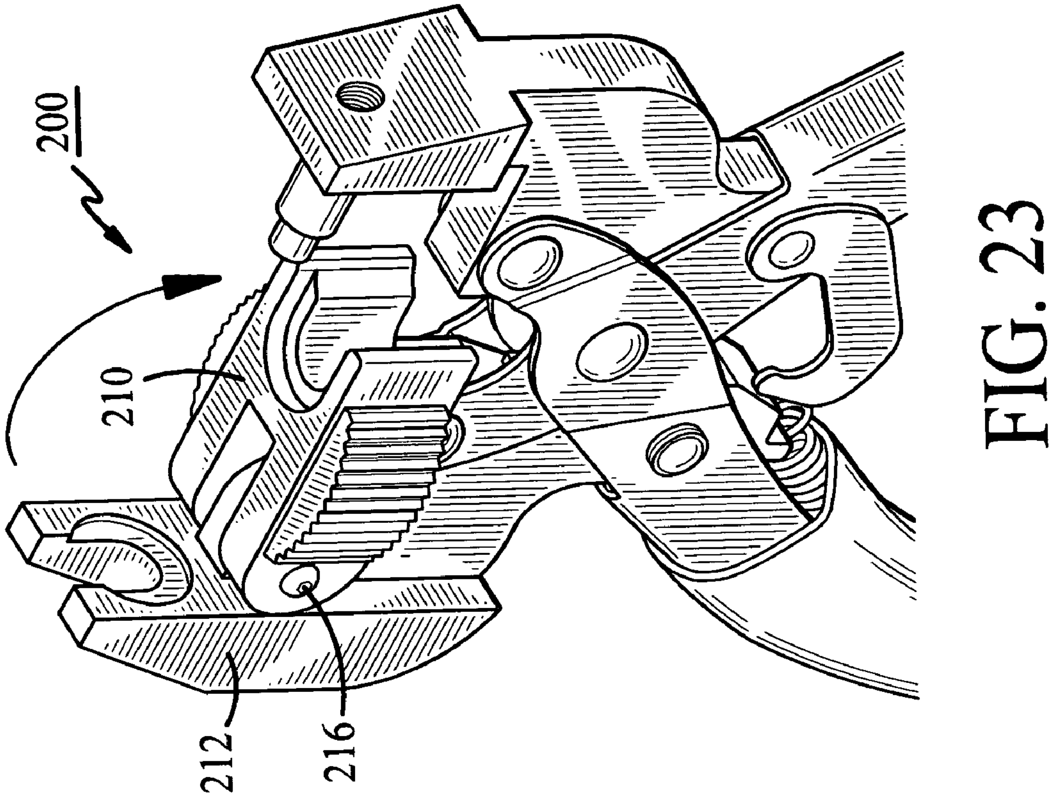
FIG. 23 is a fragmentary, top/front/right side isometric view of the tool of FIG. 21, with the support thereof in a lowered position.
Figure 22:
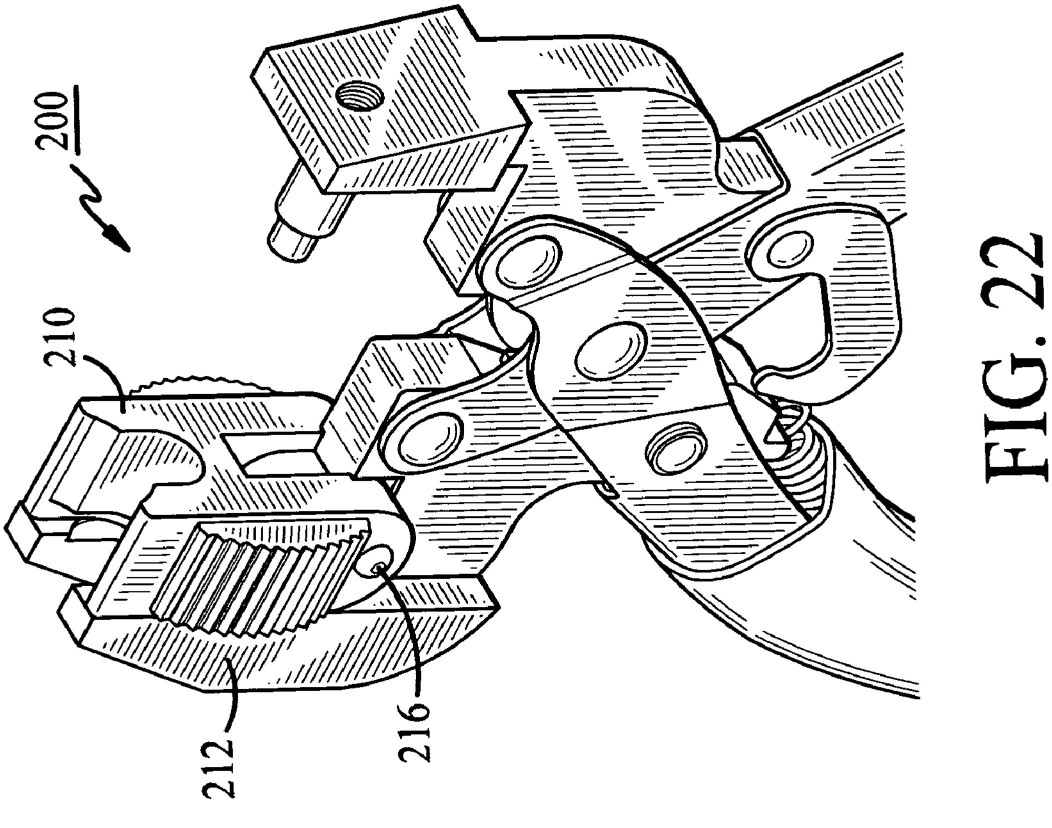
FIG. 22 is a fragmentary, top/front/right side isometric view of the tool of FIG. 21, with the support thereof in a raised position.

FIG. 22 illustrates tool 200 with support 210 in a raised position, while FIG. 23 illustrates the tool with the support in a lowered position.

Figure 24:
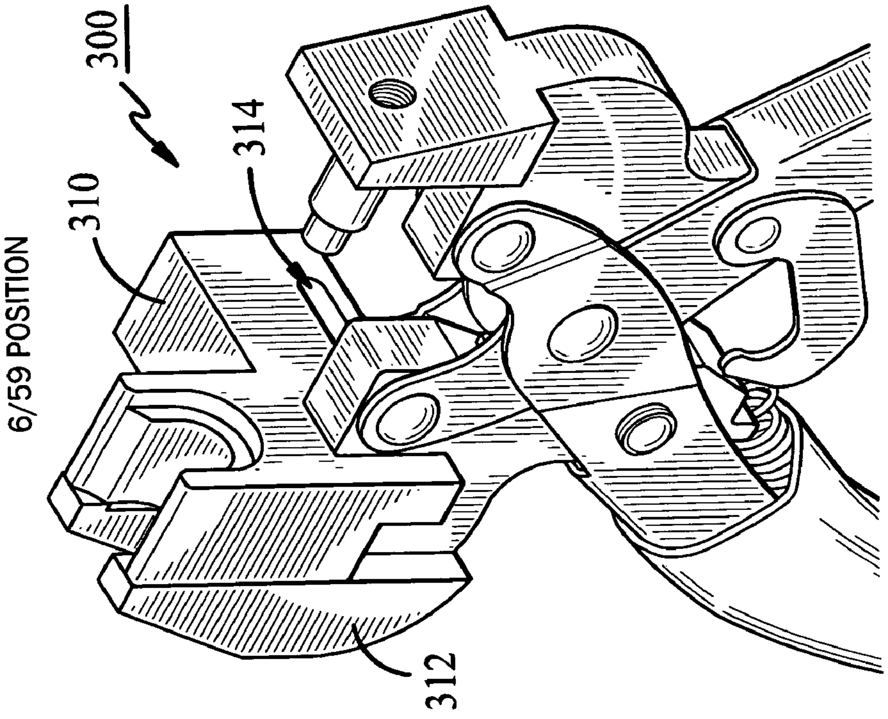
FIG. 24 is a fragmentary, top/front/right side isometric view of an end connector attachment tool constructed according to another embodiment of the present invention, with the support thereof in a first position.
Figure 25:
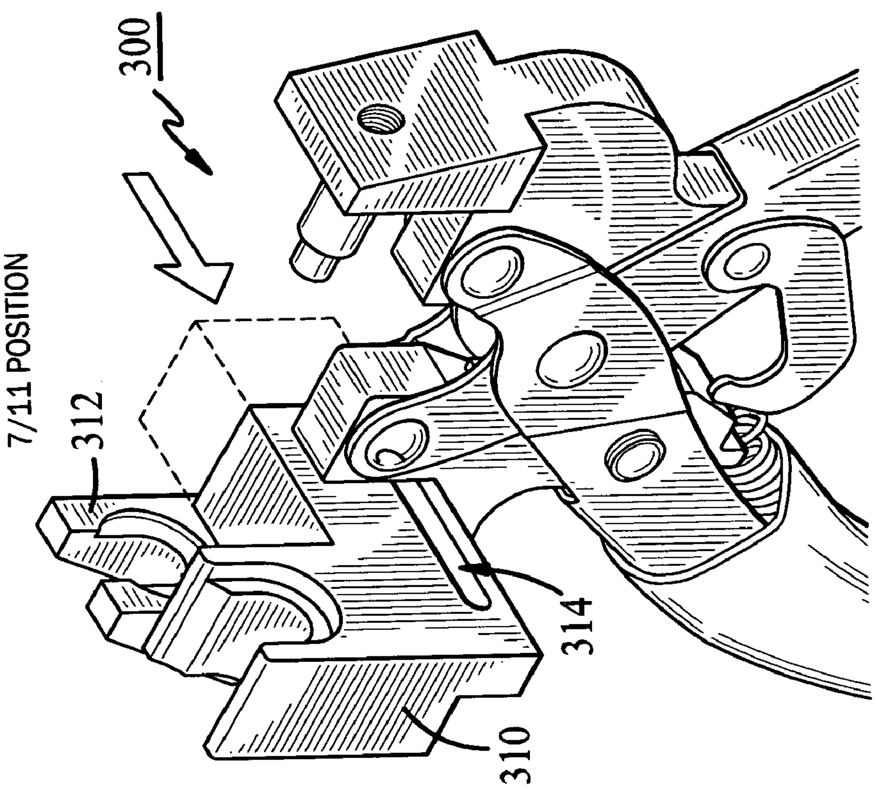
FIG. 25 is a fragmentary, top/front/right side isometric view of the tool of FIG. 24, with the support thereof in a second position.

FIG. 24 illustrates an end connector attachment tool, constructed according to another embodiment of the present invention, and generally indicated by the reference numeral 300. Elements of end connector attachment tool 300 common to respective elements of tool 30 (FIG. 1) are not given reference numerals. Tool 300 includes a horizontally moveable support 310 held in a first jaw 312 in which is formed a slot 314. On FIG. 24, support 310 is shown in a first position, while on FIG. 25, the support is shown moved horizontally to a second position, as indicated by the arrow on FIG. 25.

Figure 26:
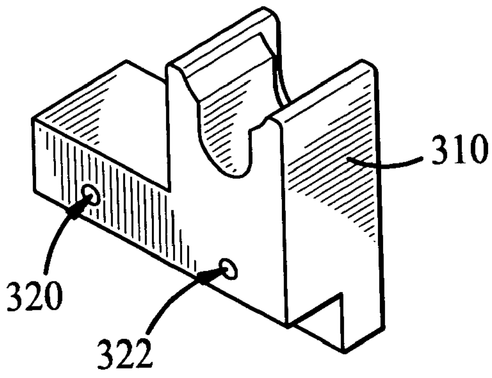
FIGS. 26-30 show details of the construction of the tool of FIG. 24.

FIG. 26 illustrates two, horizontally aligned, detent dimples 320 and 322, the function of which is similar to detent dimples 150 and 152 (FIG. 8) on support 70.

Figure 27:
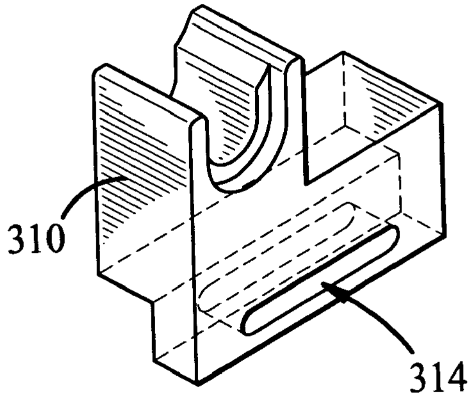

FIG. 27 illustrates horizontal slot 314 more clearly.

Figure 28:
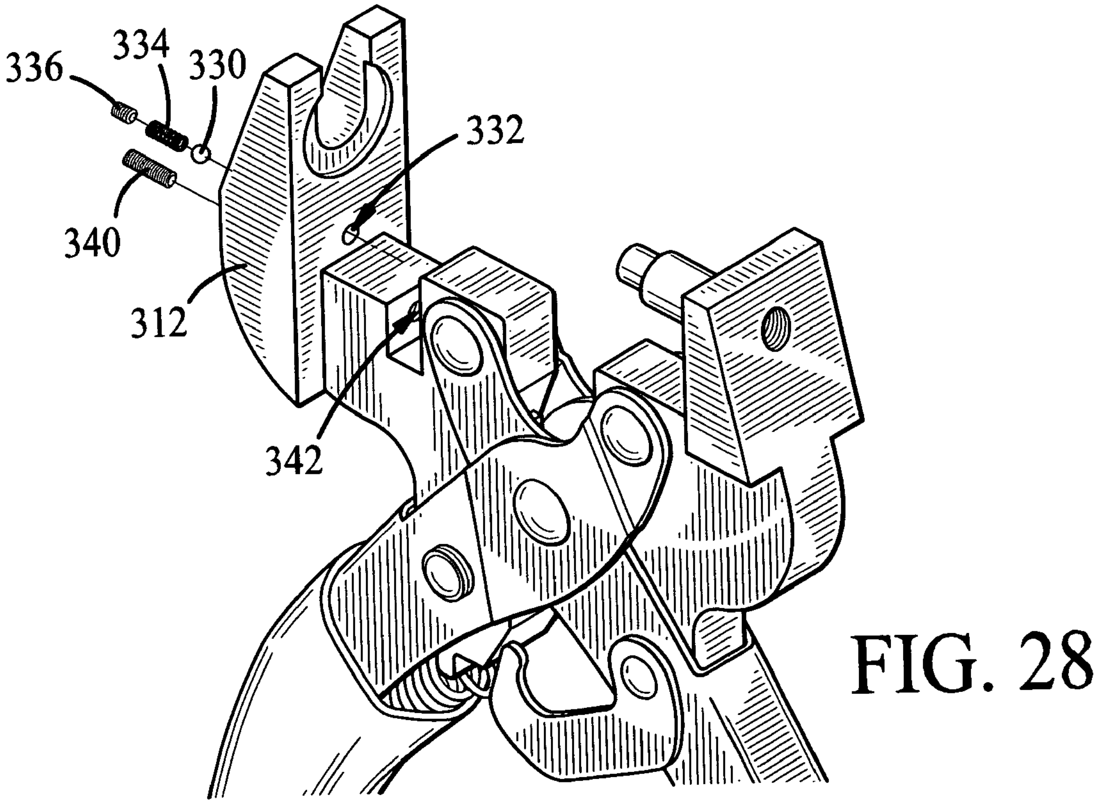

FIG. 28 illustrates detent ball 330 which engages one of detent dimples 320 and 322 (FIG. 26) and is held in engaging position in opening 332 by means of a spring 334 and a set screw 336. Also shown on FIG. 28 is a screw 340 which is threadingly inserted through a horizontal hole 342 defined through first jaw 312 and into horizontal slot 314 (FIG. 27).

Figure 30:
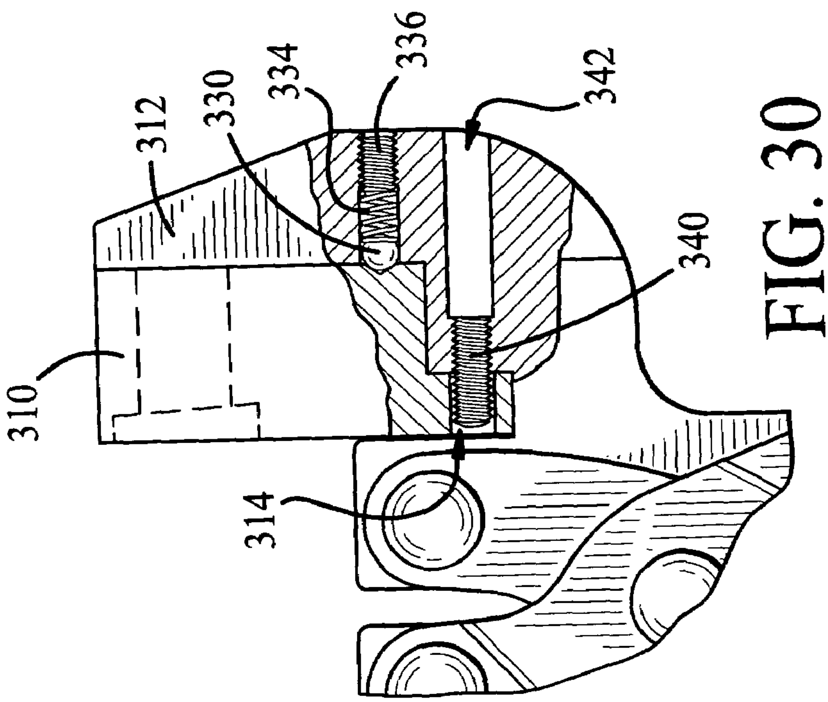
Figure 29:
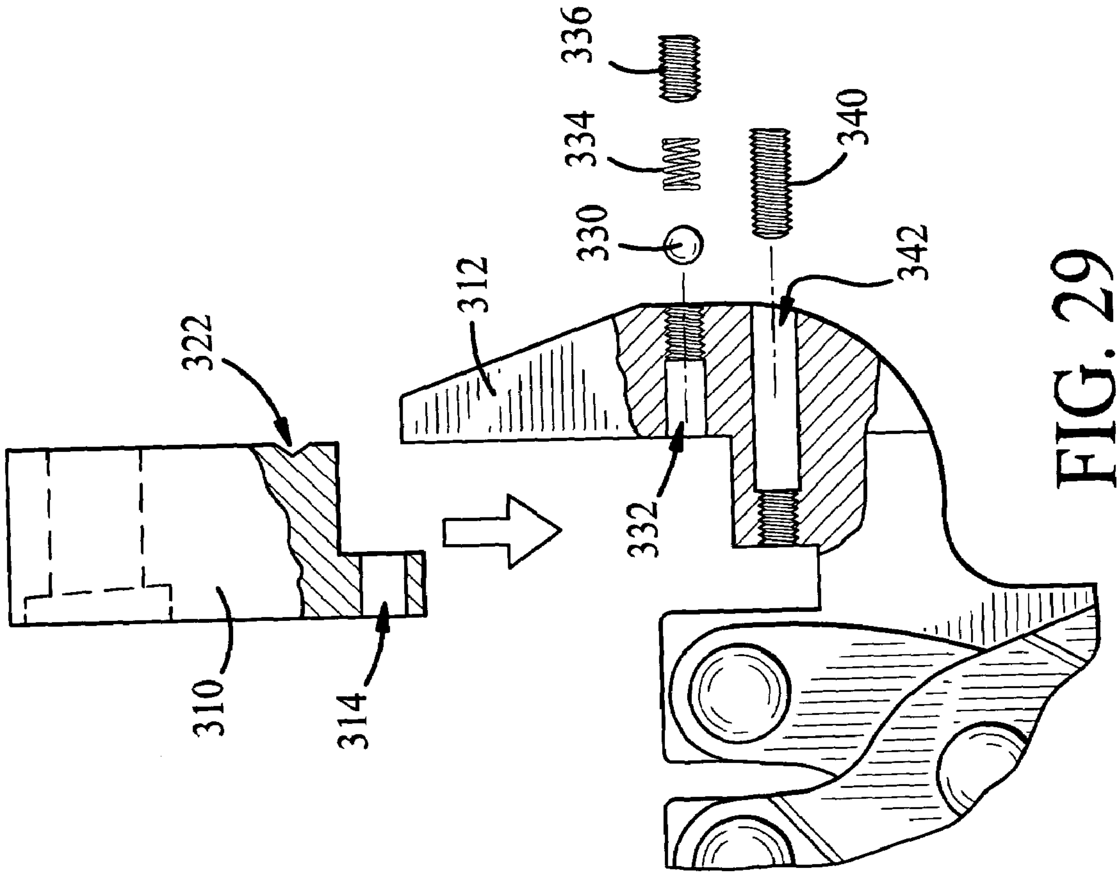

FIGS. 29 and 30 illustrate the insertion and holding of support 312 in first jaw 312.

Figure 31:
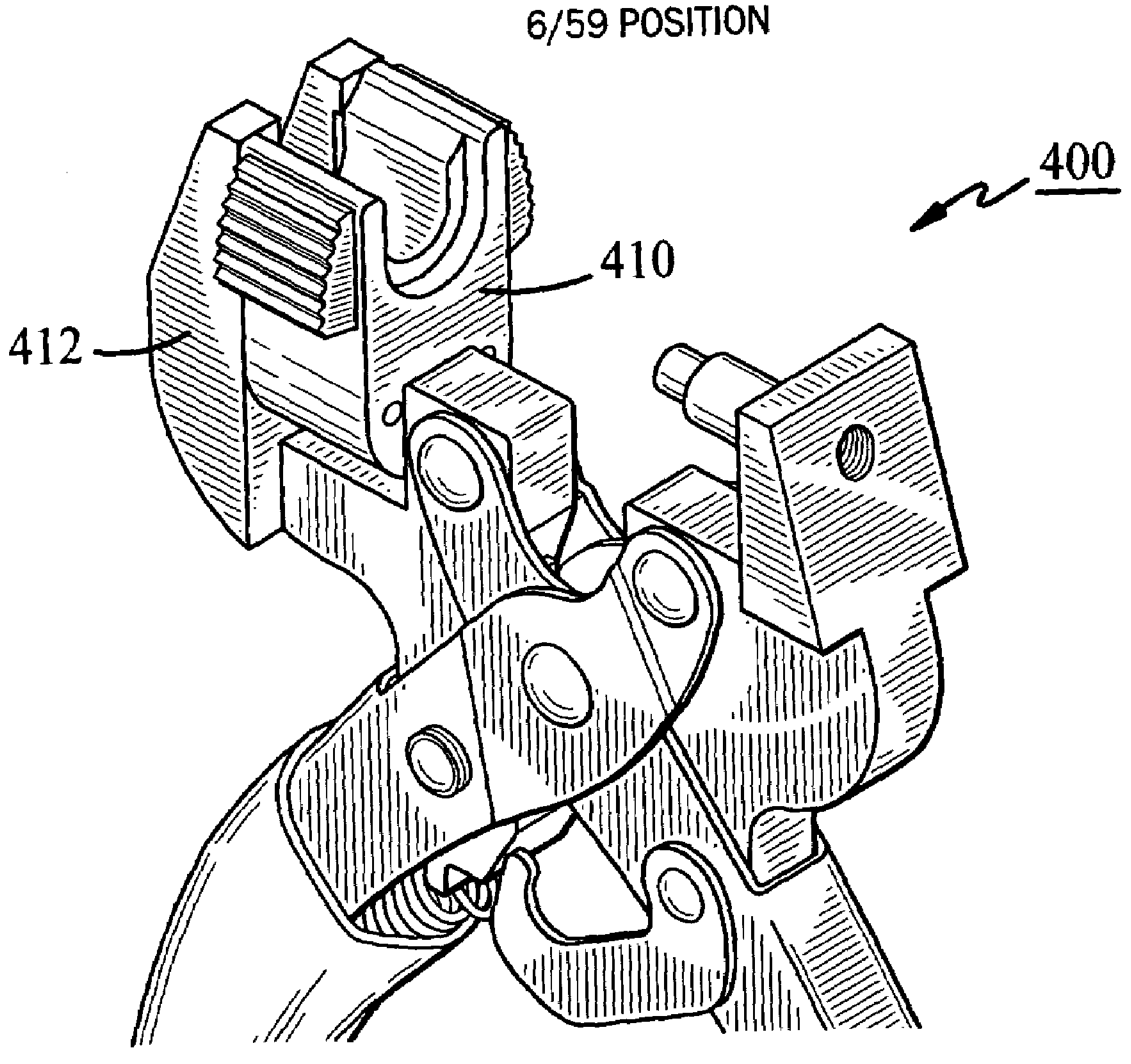
FIG. 31 is a fragmentary top/front/right side isometric view of an end connector attachment tool constructed according to an additional embodiment of the present invention, with the support thereof in a first, upright position.
Figure 33:
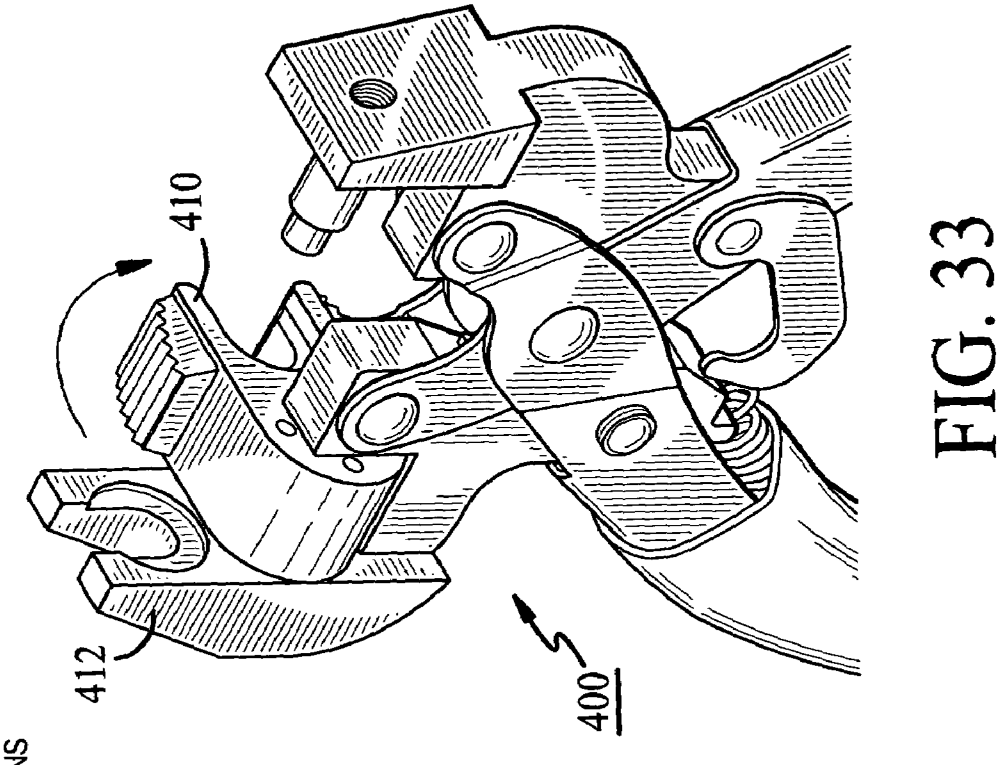
FIG. 33 is a fragmentary top/front/right side isometric view of the tool of FIG. 31, with the support thereof in a second lowered position.
Figure 32:
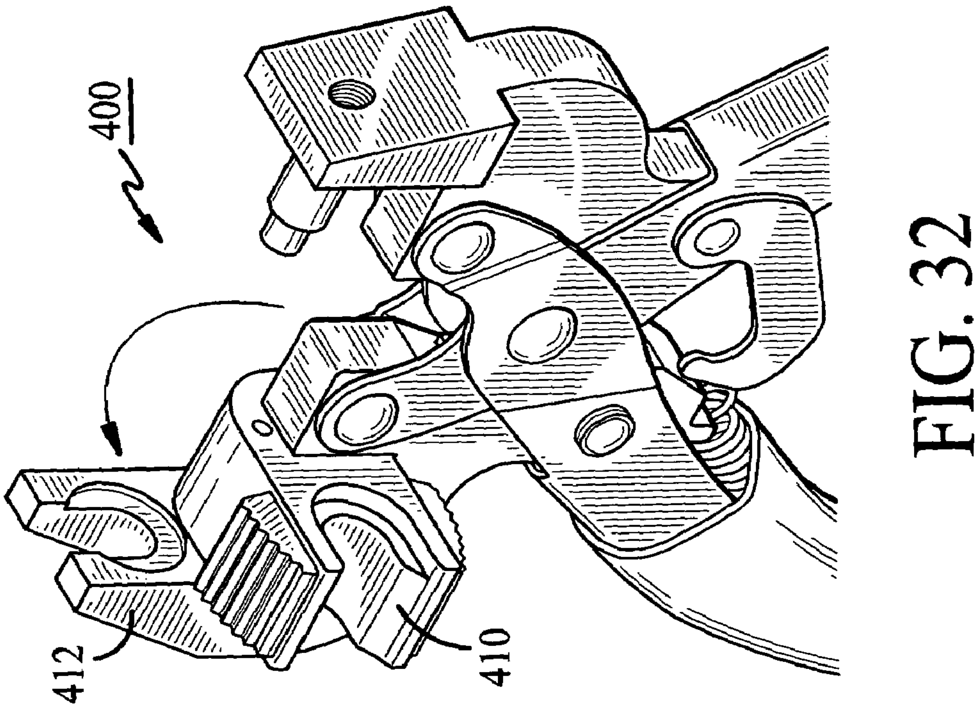
FIG. 32 is a fragmentary top/front/right side isometric view of the tool of FIG. 31, with the support thereof in a first lowered position.

FIG. 31 illustrates an end connector attachment tool, constructed according to another embodiment of the present invention, and generally indicated by the reference numeral 400. Elements of end connector attachment tool 400 common to respective elements of tool 30 (FIG. 1) are not given reference numerals. Tool 400 includes a rotatably moveable support 410 held in a first jaw 412. On FIG. 31, support 410 is shown in a first position, while on FIG. 32, the support is shown rotated ninety degrees to the left to a second position and, on FIG. 33, the support is shown rotated ninety degrees to the right to the second position, in both cases exposing the portion of jaw that can abut the proximal end of a connector.

Figure 36:
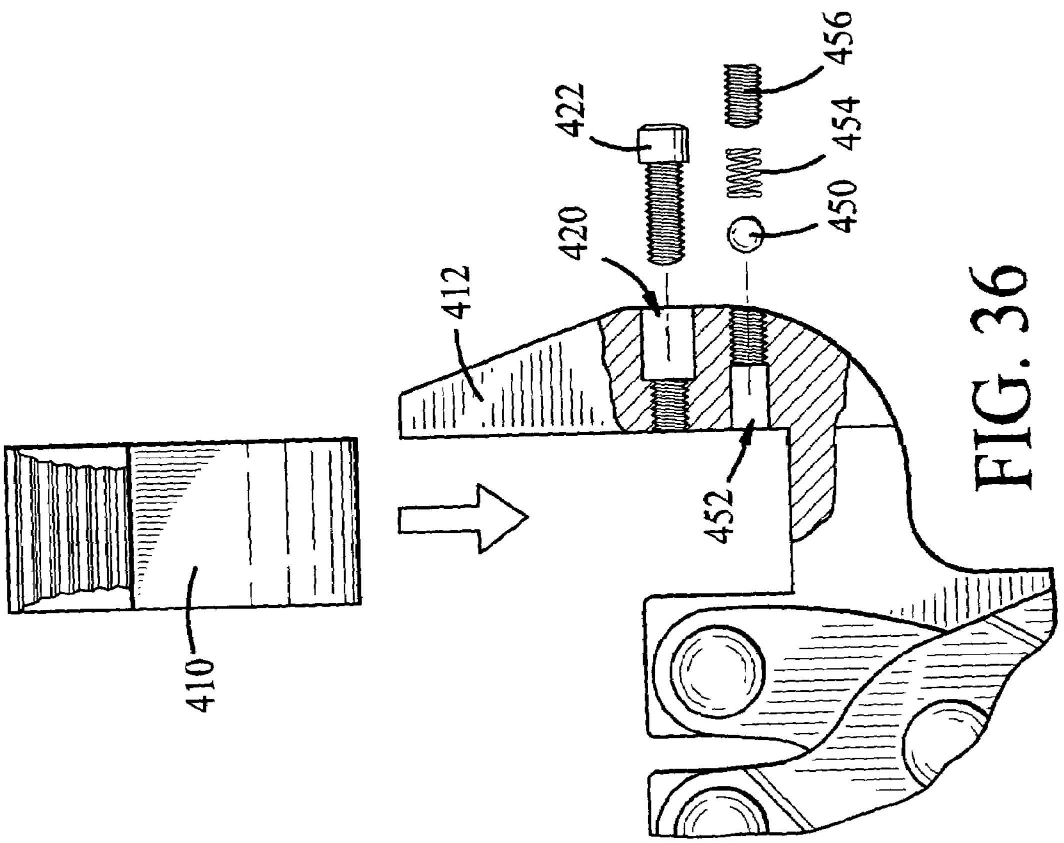
FIGS. 34-36 show the details of the construction of the tool of FIG. 31.
Figure 34:
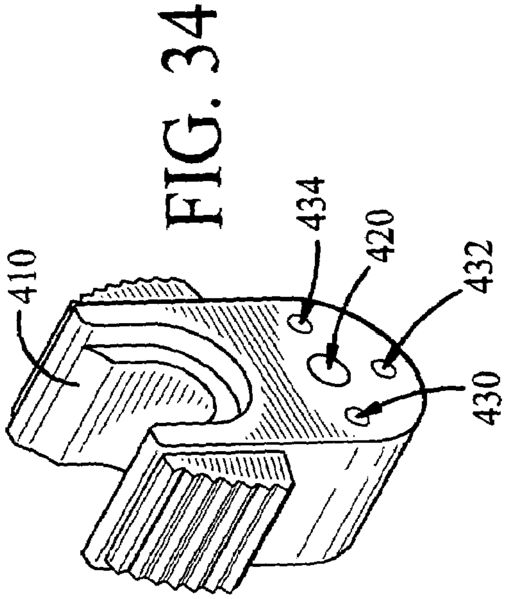
Figure 35:
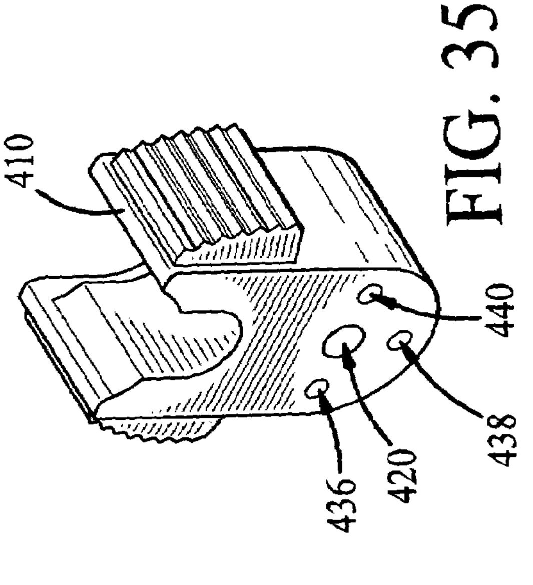

Referring to FIGS. 34 to 36, there is illustrated a hole 420 into which a fastener 422 may be threadingly inserted to secure support 410 in place in jaw 412. It will be understood that support 410 can be reversed in the manner described above with reference to FIG. 15. Shown on FIG. 34, detent dimples 430, 432, and 434 are provided on support 410 and, shown on FIG. 35, detent dimples 436, 438, and 440 are provided on the support, each of which is engagable by detent ball 450 (FIG. 36) secured in hole 452 by means of spring 454 and set screw 456, the function of which elements has been described above.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An apparatus, comprising:

(a) first and second jaws rotatably attached, respectively, to first and second handles, which are in turn rotatably attached to each other, said first and second jaws axially advanceable toward and retractable from each other by, respectively, advancing said first and second handles toward and away from each other;

(b) when advanced toward each other, said first and second jaws firmly attaching an end connector to a cable, elements of said end connector being loosely attached to said cable when said cable and said elements are placed between said first and second jaws before firm attachment of said elements to said cable;

(c) said first jaw having a support movable between first and second positions;

(d) when said support is in said first position, a first surface of said support to abut a proximal surface of said end connector; and (e) when said support is in said second position, a second surface of said support to abut said proximal surface.

2. An apparatus, as defined in claim 1, wherein: said support is engaged by first and second detents, respectively, when said support is in its first and second positions.

3. An apparatus, as defined in claim 1, wherein: said support is rotatable 180 degrees to present to said proximal surface a second surface of said support.

4. An apparatus, as defined in claim 1, wherein: said first and second jaws are at distal ends, respectively, of said first and second handles.

5. An apparatus, as defined in claim 1, wherein: an anvil is attached to said second jaw to engage therein a center conductor of said cable.

6. An apparatus, as defined in claim 1, wherein: said support is movably held in a slot defined in said first jaw.

7. An apparatus, as defined in claim 1, wherein: said first surface is angled such that an upper portion of said first surface abuts said proximal surface before rest of said first surface abuts said proximal surface.

8. An apparatus, as defined in claim 3, wherein: said support is movably held in a slot defined in said first jaw.

9. An apparatus, as defined in claim 1, wherein: said support is moveable between said first and said second positions by moving said support parallel to a major axis of said apparatus.

10. An apparatus, as defined in claim 1, wherein: said support is movable between said first and said second positions by moving said support orthogonal to a major axis of said apparatus.

11. An apparatus, as defined in claim 1, wherein: said support is movable between said first and second positions by rotating said support.

* * * * *